US006757263B1

(12) United States Patent
Olds

(10) Patent No.: US 6,757,263 B1
(45) Date of Patent: Jun. 29, 2004

(54) WIRELESS REPEATING SUBSCRIBER UNITS

(75) Inventor: Keith A. Olds, Mesa, AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/548,818

(22) Filed: Apr. 13, 2000

(51) Int. Cl.[7] ................................................ H04J 3/08
(52) U.S. Cl. ................................................ 370/315
(58) Field of Search .............................. 370/310, 310.2, 370/313, 315–321, 325, 326, 332–334, 335–337, 354–356, 345, 346, 349, 254; 456/422.1, 426.2, 428, 25

(56) References Cited

U.S. PATENT DOCUMENTS

| | | | |
|---|---|---|---|
| 4,747,160 A | | 5/1988 | Bossard |
| 5,590,133 A | * | 12/1996 | Billstrom et al. ........... 370/349 |
| 5,612,948 A | * | 3/1997 | Fette et al. .................. 370/252 |
| 5,701,583 A | * | 12/1997 | Harbin et al. ................ 455/25 |
| 5,781,547 A | * | 7/1998 | Wilson ....................... 370/352 |
| 5,794,120 A | * | 8/1998 | Cutler, Jr. et al. .......... 455/13.1 |
| 5,860,058 A | * | 1/1999 | Daniel et al. .............. 455/12.1 |
| 5,889,770 A | * | 3/1999 | Jokiaho et al. ............. 370/337 |
| 6,016,313 A | * | 1/2000 | Foster, Jr. et al. .......... 370/330 |
| 6,233,463 B1 | * | 5/2001 | Wiedeman et al. ....... 455/552.1 |
| 6,408,179 B1 | * | 6/2002 | Stosz et al. ................ 455/428 |
| 6,449,267 B1 | * | 9/2002 | Connors ..................... 370/347 |

FOREIGN PATENT DOCUMENTS

JP      JPH7-23444    *   1/1995   ............ H04Q/7/22

* cited by examiner

Primary Examiner—Kwang Bin Yao
(74) Attorney, Agent, or Firm—Bradley J. Botsch; Frank J. Bogacz

(57) ABSTRACT

A connectionless, wireless network (20) includes any number of subscriber units (24) and gateways (22). The subscriber units (24) and gateways (22) are configured to engage in wireless communications with preferably more than one other node. The gateways (22) provide portals through which communications may flow to and from the PSTN (26). A repeating subscriber unit (24) includes a router (34) to aid in routing data conveyances to various communication links (25). A routing table (76) provides intelligence which is independent of other routing tables (76) in other subscriber units (24) and gateways (22) and which indicates a variety of routes for data conveyances. Each repeating subscriber unit (24) makes its own decisions about where to route data conveyances based upon the destinations of the data conveyances and feedback received from neighbors of the repeating subscriber unit (24). Communication links (25) previously selected for routing data conveyances may be altered when conditions warrant. More favorable routes are sought when previously selected routes encounter excessive congestion.

27 Claims, 9 Drawing Sheets

| | 54 | 56 | |
|---|---|---|---|
| | EVENT | ACTION | |
| 58 | PACKET RECEIVED | - EVALUATE DESTINATION AND ROUTE PACKET TO CORRESPONDING ROUTER QUEUE;<br>- SEND ACK MESSAGE WITH QUALITY INDICATION | 74 |
| 84 | NEIGHBOR UPDATE NEEDED | NEIGHBOR UPDATE REQUEST PROCESS | 86 |
| 108 | NEW UPDATE REQUEST RECEIVED | NEIGHBOR UPDATE REPLY PROCESS | 110 |
| 124 | ROUTER QUEUE HAS DATA FOR PTD | MOVE DATA TO PAYLOAD TERMINAL DEVICE (PTD) | 126 |
| 128 | ROUTER QUEUE HAS DATA FOR LAN | MOVE DATA TO LOCAL DATA NETWORK (LAN) | 130 |
| 132 | ROUTER QUEUE HAS A LONG MESSAGE FOR A FOREIGN DESTINATION | DEMAND ASSIGNED MULIPLE ACCESS (DAMA) REQUEST PROCESS | 134 |
| 160 | REQUEST RECEIVED OVER RACH | DEMAND ASSIGNED MULIPLE ACCESS (DAMA) REPLY PROCESS | 162 |
| 178 | SCHEDULED DATA RIPE FOR TRANSMISSION | DEMAND ASSIGNED MULIPLE ACCESS (DAMA) REPLY PROCESS | 180 |
| 212 | ROUTER QUEUE HAS A SHORT MESSAGE FOR A FOREIGN DESTINATION | USE RANDOM ACCESS CHANNEL (RACH) SHORT MESSAGE CHANNEL TO SEND DATA | 214 |
| 216 | UPDATE ROUTING TABLE TRIGGER | UPDATE ROUTING TABLE | 218 |

*FIG. 4*

WIRELESS REPEATING SUBSCRIBER UNITS

TECHNICAL FIELD OF THE INVENTION

The present invention relates generally to communication networks. More specifically, the present invention relates to communication networks in which repeating subscriber units are interconnected through wireless communication links.

BACKGROUND OF THE INVENTION

While wireless communication provides numerous advantages for mobile applications, wireless communication has been conventionally viewed as less suitable where ends of a communication path are stationary. Wireless communication suffers from numerous challenges, including a need to use and reuse a minimum amount of assigned radio frequency spectrum as efficiently as possible, a need to prevent and tolerate interference, a need to tolerate multipath, fades and other RF signal difficulties, and often a need to consume a greater amount of power compared to wireline communications to convey signals a given distance. Accordingly, when ends of a communication path are stationary, cables or wires which physically attach to communication devices at the ends (i.e., wireline communications) of the communication path have conventionally been viewed as a desirable solution to the numerous wireless communication challenges.

But wireline communication has its own set of challenges to overcome. For example, a tremendous amount of time and expense may be involved in running cables between various locations. Accordingly, high bandwidth RF communication systems have been proposed for the wireless distribution of communications, and particularly broadband communications, between stationary locations. Typically, such systems propose operation at S-band and higher frequencies where the signal propagation path tends to follow a line-of-sight. At these higher frequencies, communication signals suffer from severe attenuation or obstruction by geographical features, such as hills and mountains, man-made structures, foliage, and/or rain. Operation at such higher frequencies enables the communication of high data rates because larger amounts of the electromagnetic spectrum are available for use. In addition, highly directional, small antennas may be cheaply manufactured for operation at such higher frequencies, and interference is managed and frequency reuse enhanced by operating at low power using such highly directional antennas.

High bandwidth RF communication networks with repeating subscriber units have been proposed as a solution to the challenges of line-of-sight wireless communications. Subscriber units are the communication devices located at the premises of customers or subscribers of the network. Through subscriber units, the subscribers transmit and receive data, which may be in the form of video, audio, voice, computer, or other data. By configuring subscriber units to also function as repeaters, the range and coverage of the network may be expanded. Subscriber units which may not be able to engage in high frequency wireless communications with a base station due to some signal obstruction between the subscriber's premises and the base station may still be able to engage in wireless communications with a neighbor subscriber unit. When the neighbor subscriber unit functions as a repeater, those communications may be repeated to the base station or to another repeating subscriber unit that will forward the communications to a base station.

One problem experienced by proposed wireless communication networks which rely on repeating subscriber units is reliance on a centralized, cellular-like, network architecture. In such a centralized system, network data traffic for each subscriber unit passes through a base station in whose jurisdiction the subscriber unit is located. This causes the traffic to become concentrated as it nears the base station. Traffic bottlenecks may develop because repeating subscriber units located near the base station are required to handle a large percentage of the traffic which passes through the base. At the same time, repeating subscriber units located at the edge of a base station's cell are required to handle very little traffic beyond that which terminates at the subscriber unit. Moreover, direct subscriber unit to subscriber unit communications which bypass the base are not permitted under the centralized architecture. Consequently, further inefficiencies in traffic distribution throughout the network result.

Furthermore, in a centralized system routing decisions (i.e., determinations about how to route communications through various repeating subscriber units between a base station and a terminating subscriber unit) tend to be made at the base station. However, the base station does not have knowledge of conditions currently experienced by various repeating subscriber units from moment to moment. Thus, the base station repeatedly sends probe messages through its domain to gain the knowledge needed to make routing decisions. The use of such probe messages is undesirable because probe messages consume system resources which might otherwise be used to convey subscriber payload data. Moreover, data determined from probe messages tends to become stale quickly, and routing decisions based on such messages tends to be outdated unless a lot of system resources are dedicated to probing.

Another problem experienced by proposed wireless communication networks which rely on repeating subscriber units is a reliance on connection-oriented or circuit switched traffic distribution. In a connection-oriented system, network resources are allocated from end-to-end of a "call" throughout the duration of a call from call setup to call tear down. This type of traffic distribution is particularly inefficient in networks which rely on repeating subscriber units because most of the networks traffic distribution resources are not actively used for a large percentage of the duration of the call. Connection-oriented switching also poses a packing problem because routing or packing a large item, such as an entire end-to-end call path, in a given network or space is a more difficult task than routing or packing several smaller items in the same network or space.

The problems suffered by wireless networks that rely on repeating subscriber units are compounded when both centralized control and connection-oriented switching are used.

Another problem with proposed wireless communication networks which rely on repeating_subscriber units is that they are not well suited to interoperate with common network standards such as the interval protocol suit (TCP/IP). This results in poor performance, or the need for expensive custom protocols, or both.

Therefore, what is needed is an improved repeating wireless subscriber unit which is useable in a wireless communication network and which efficiently utilizes resources so that the repeating subscriber units and wireless network may be kept as simple, reliable, and inexpensive as possible. It should also be well suited for operating in a network that provides an efficient underlying infrastructure upon which standard network protocols and services can be operated.

BRIEF DESCRIPTION OF THE DRAWINGS

A more complete understanding of the present invention may be derived by referring to the detailed description and claims when considered in connection with the figures, wherein like reference numbers refer to similar items throughout the figures, and:

FIG. 4 shows a table of events recognized by the RSU shown in FIG. 2 and of actions taken in response to those events;

DETAILED DESCRIPTION OF A PREFERRED EMBODIMENT

Figure 1:
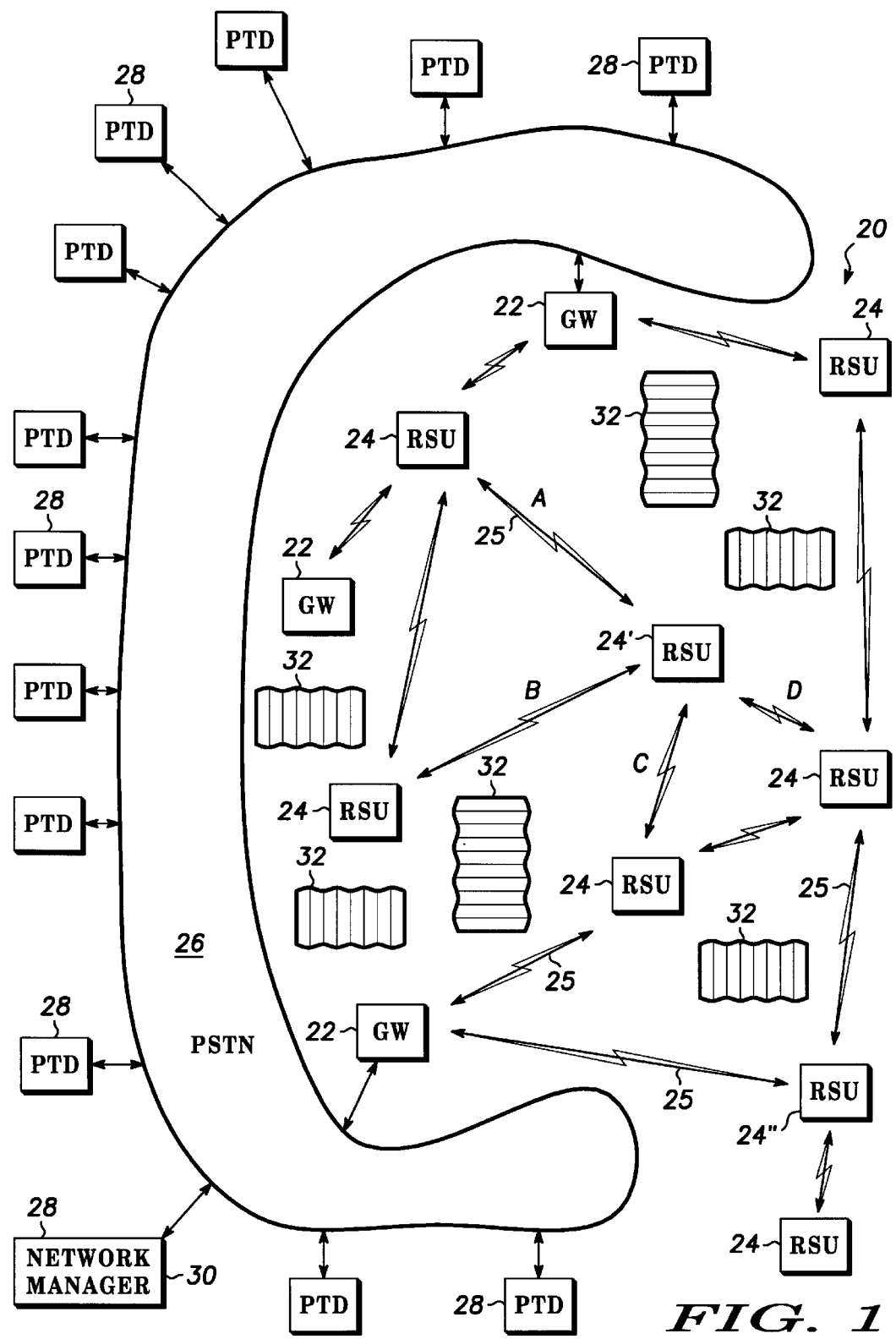
FIG. 1 shows a block diagram of a wireless communication network configured in accordance with the teaching of the present invention.

FIG. 1 shows a block diagram of a wireless communication network 20 configured in accordance with the teaching of the present invention. Network 20 includes any number of gateways (GW's) 22 and subscriber units 24. Subscriber units 24 are in data communication with other nearby subscriber units 24 and nearby gateways 22 through bidirectional wireless communication links 25. Subscriber units 24 are discussed in detail below. Each gateway 22 couples to a public switched telecommunications network (PSTN) 26 in a conventional manner. A large number of payload terminal devices (PTD's) 28 also couple to PSTN 26 as does a network manager 30.

Payload terminal devices (PTD's) 28 provide any or all of a wide range of communication functions. In general, PTD's originate or terminate data which is communicated through network 20. A purpose for network 20 and for the communication of data within and through network 20 is the conveyance of payload data between PTD's 28. As is discussed in more detail below, subscriber units 24 also have PTD's 28 associated therewith. Examples of payload data originated and/or consumed by PTD's include video signals, audio signals, voice signals, computer data, E-mail, Internet data traffic, industrial or appliance control data, and the like. Examples of PTD's 28 include computers, televisions, telephonic devices, video transmission equipment, audio receivers, audio broadcast equipment, industrial equipment, appliances and the like. While a PTD 28 may be the ultimate destination for certain payload data, nothing prevents that PTD 28 from or requires that PTD 28 to forward the payload data to another PTD 28.

PSTN 26 represents the ubiquitous telecommunications network which is present throughout most of the human-inhabited portions of the Earth. PSTN 26 includes any number of interconnected networks. Such interconnected networks may include the Internet and various satellite-based and terrestrial-based networks. Although the invention is described in the context of connection to the PSTN, nothing prevents the invention from connection to other public or private networks.

Network manager 30 is a computer device which provides managerial functions for network 20. As such, network manager 30 is a specific form of a PTD 28. One such function performed by network manager 30 is billing. Another function is that of providing a centralized repository for data which describes network 20. Such data includes, among other things, the identities of all gateways 22 and subscriber units 24 included in network 20 and the identities of neighbors for all gateways 22 and subscriber units 24. From the perspective of a single gateway 22 or subscriber unit 24, neighbors represent other gateways 22 and/or subscriber units 24 with which the single gateway 22 or subscriber unit 24 may communicate directly without having a communication path pass through an intermediate gateway 22 or subscriber unit 24. In alternate equally preferable embodiments, the functions of network manager 30 may be distributed among any number of computer devices which may or may not be located near one another, and such computer devices, or only a portion of them, may communicate directly with certain nodes of network 20 using wireless communication rather than indirectly through PSTN 26.

Many, and perhaps even all, of subscriber units 24 in network 20 may be configured as repeating subscriber units (RSU's). A repeating subscriber unit 24 includes a PTD 28 and also includes sufficient equipment and intelligence (discussed below) to repeat data traffic received from neighbors to aid the progress of the traffic toward its destination. Desirably, each repeating subscriber unit 24 supports any number of preferably low power, wireless communication links 25 between itself and its neighbors.

Wireless communication links 25 are desirably directional links in which antennas therefor achieve greater than 10 dB of gain so that the main antenna pattern is substantially confined within 50°. More preferably, such antennas achieve more than 25 dB of gain so that the main antenna pattern is substantially confined within 10°. In one embodiment, wireless communication links 25 are configured as optical links conveyed via laser and laser detectors. Through the use of low power transmission and directional antennas, interference is reduced and spectrum reuse increased so that a given spectrum used by network 20 conveys an increased amount of traffic. Wireless communication links 25 may be further formatted to communicate using code division multiple access (CDMA), time division multiple access (TDMA), frequency division multiple access (FDMA), or other access techniques or combinations thereof.

Subscriber units 24 are preferably maintained at substantially stationary locations. Accordingly, even with highly directional wireless communication links 25, once a subscriber unit 24 learns of a neighbor's location within network 20, it can reliably find the neighbor again at a later time, and maintain a reliable link 25 with the neighbor for as long as necessary.

As schematically illustrated in FIG. 1, any number of obstructions 32 may reside proximate various ones of subscriber units 24 and gateways 22. Obstructions 32 are typically geographical features, such as hills or mountains, man-made structures, such as houses, buildings or towers, foliage, and the like. Due to the presence of obstructions 32 and of low power transmissions which may not propagate as far as higher power transmissions, wireless communication links 25 cannot be suitably formed between certain gateways 22 and/or subscriber units 24 as would be possible if such obstructions were not present or higher power transmissions were used. Accordingly, for communications to terminate with certain subscriber units 24, such communications are repeated through any number of intermediate repeating subscriber units 24.

In the preferred embodiment depicted in FIG. 1, gateways (GW's) 22 serve as repeaters which interface between PSTN 26 and network 20. However, gateways 22 need have no special association with any particular subscriber units 24, other than those which happen to be neighbors. Desirably, the routing control of data traffic is distributed among gateways 22 and subscriber units 24 rather than centralized. In other words, each subscriber unit 24 has routing intelligence which is independent of the routing intelligence located at other nodes in network 20. On an instant-by-instant basis, each subscriber unit 24 and gateway 22 makes routing decisions based on conditions each one is experiencing. Such conditions are determined, at least in part, by feedback received from its neighbors. A large amount of traffic which has one terminus in network 20 may have another terminus reachable through PSTN 26. For such communications, subscriber units 24 may route traffic through any gateway 22 rather than through a specified gateway 22 to which a subscriber unit 24 might have been assigned in a more centralized system.

Figure 2:
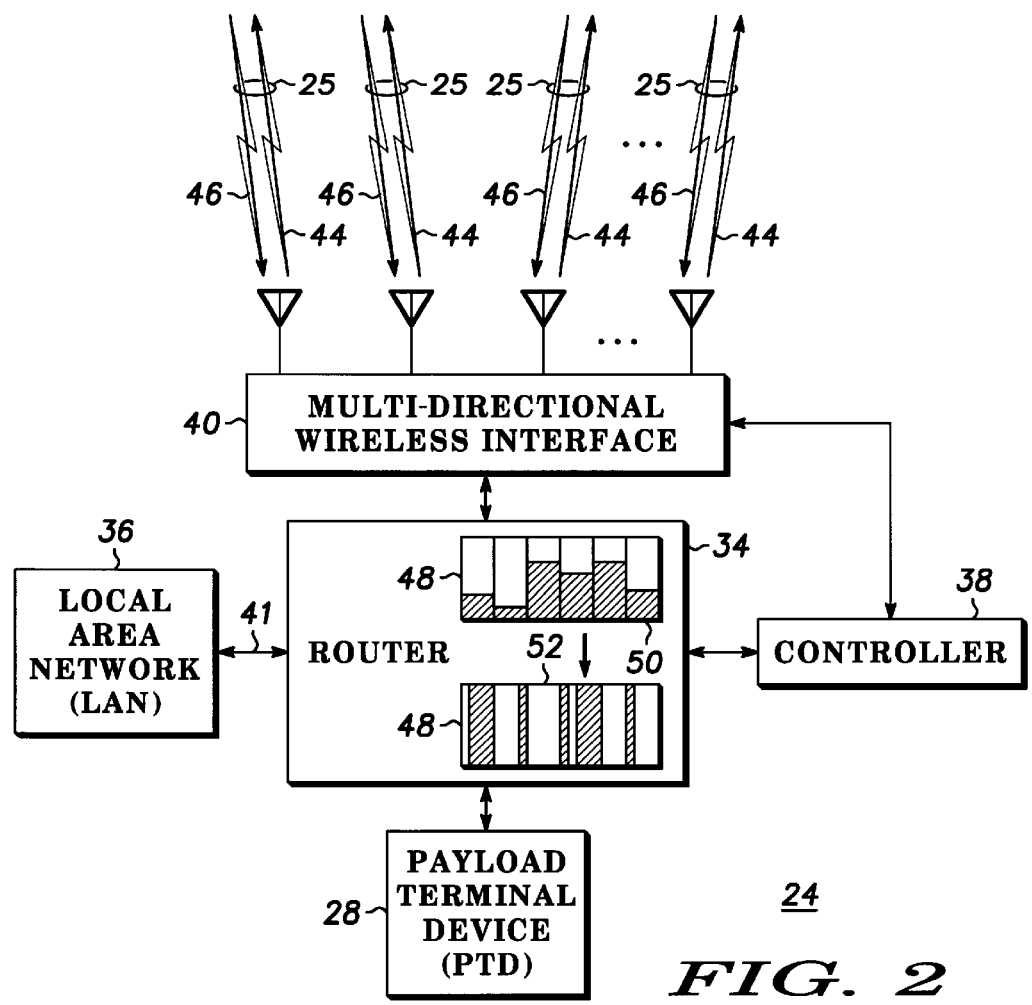
FIG. 2 shows a block diagram of a wireless repeating subscriber unit (RSU) used at a plurality of nodes in one preferred embodiment of the network of FIG. 1.

FIG. 2 shows a block diagram of a wireless repeating subscriber unit (RSU) 24 of a type used at a plurality of nodes in network 20. The below-presented discussion focuses on a repeating subscriber unit (RSU) 24 even though not all subscriber units in network 20 are required to be repeating subscriber units. Desirably, all repeating subscriber units 24 are configured similarly and operate in substantially the same manner with respect to routing data traffic.

RSU 24 includes a payload terminal device (PTD) 28 which may be similar in construction to any of the myriad of configurations for PTD 28 discussed above in connection with FIG. 1. PTD 28 couples to a router 34. In one embodiment, router 34 is a conventional router which interfaces between networks, provides switching between the networks, reads at least portions of packets, filters packets based upon specified criteria, and/or buffers packets for retransmission to other nodes. Router 34 couples to an optional local area network (LAN) 36, a controller 38, and a multi-directional wireless interface 40. Controller 38 also couples to multi-directional wireless interface 40.

In the preferred embodiment, router 34 couples to LAN 36 through a wireline connection 41. Many LANs require routers to interface to other networks. Accordingly, router 34 serves the dual functions of being a LAN router while simultaneously performing certain routing-type functions, discussed below, for wireless network 20 (FIG. 1). Cost savings and improved reliability result over using separate routers for separate networks.

Multi-directional wireless interface 40 provides an air-interface for RSU 24. Interface 40 includes any number of directional antennas 42 and related transceiver circuits (not shown) to support any number of communication links 25 with neighbor gateways 22 or subscriber units 24. As illustrated in FIG. 2, each communication link 25 has a transmit path 44 and a receive path 46 from the perspective of a given RSU 24. In a first embodiment, one directional antenna 42 may be provided for each neighbor gateway 22 or neighbor subscriber unit 24.

Figure 3:
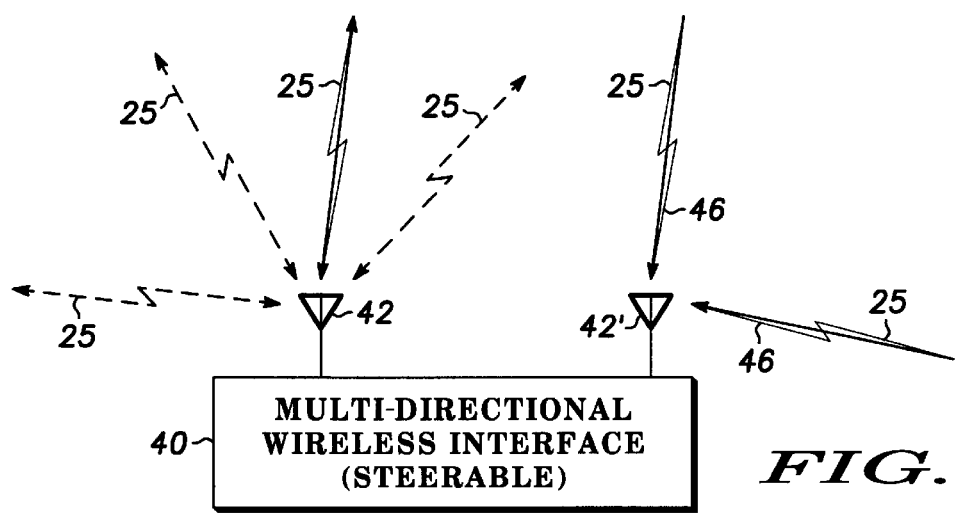
FIG. 3 shows a block diagram of a second preferred embodiment of a multi-directional wireless interface portion of the RSU shown in FIG. 2.

FIG. 3 shows a block diagram of a second preferred embodiment of multi-directional wireless interface 40. In this second embodiment, one or more steerable, and more preferably electronically steerable, directional antennas 42 are provided and controlled to form links 25 with any number of neighbors. Steerable antennas 42 may be formed and controlled using conventional phased antenna array techniques or laser steering techniques. While the first embodiment (FIG. 2) may have a number of neighbors limited by the number of antennas 42 and transceivers (not shown) available, the second embodiment (FIG. 3) has no such limitation. In this second embodiment, an omni-directional antenna 42' may be added in order to receive signals transmitted from any neighbor over a random access channel (RACH) without requiring an RSU 24 to have its antenna 42 already steered toward that neighbor.

Referring back to FIG. 2, router 34 includes a memory buffer 48 which may include any number of queues. As packets are received at RSU 24, they are placed in buffer 48 to await an opportunity to be repeated to another node in network 20, to be passed to PTD 28, or to be transferred to LAN 36. A router queue 50 portion of buffer 48 may be used by router 34 as packets are received to route the packets to their intended destinations, as indicated by the location within router queue 50 where the packets are placed as they are received. In addition, a scheduled queue 52 portion of buffer 48 may be provided to aid implementation of demand assigned multiple access (DAMA) channels (discussed below) between RSU 24 and its neighbors. At a given instant, buffer 48 may be characterized by a capacity parameter which varies in response to an amount of data held in buffer 48. As buffer 48 holds more data awaiting delivery to its destination, that capacity decreases, and as buffer 48 holds less data awaiting delivery to its destination, that capacity increases.

While FIG. 2 illustrates controller 38 as being separate from router 34, those skilled in the art will appreciate that controller 38 may be a controller for router 34 or a separate controller if that is more convenient. Whether or not separate from router 34, controller 38 provides routing intelligence for RSU 24 that is independent from the routing intelligence included elsewhere in network 20 (FIG. 1). Controller 38, with the aid of router 34 and multi-directional wireless interface 40, determines to which of the neighbors to route packets received at RSU 24 in response to destination address data conveyed by the packets and in response to feedback provided from the neighbors.

Gateway 22 (FIG. 1) differs only slightly from the structure illustrated in FIG. 2 for RSU 24. Instead of or in addition to coupling to LAN 36 through wireline connection 41, router 34 of gateway 22 couples to PSTN 26 (FIG. 1) through an appropriate interface. Gateway 22 performs the various interworking functions, such as protocol and address translation necessary to facilitate the flow of packets between the RSU's and the PSTN. In a typical embodiment, gateway 22 may omit PTD 28, but this is not a requirement.

FIG. 4 shows a table of events 54 recognized by RSU 24, and by controller 38 (FIG. 2) therein, and of associated actions 56 taken by RSU 24 in response to events 54. Events 54 are recognized by controller 38 in a manner well known to those skilled in the arts of computer-controlled radio devices and router manufacture. Actions 56 result, at least in part, through computer software which is stored in a memory (not shown) associated with controller 38 of RSU 24 and executed by controller 38.

A packet received event 58 occurs when RSU 24 receives a packet over receive path 46 (FIGS. 2–3) of communication link 25 (FIGS. 2–3).

Figure 5:
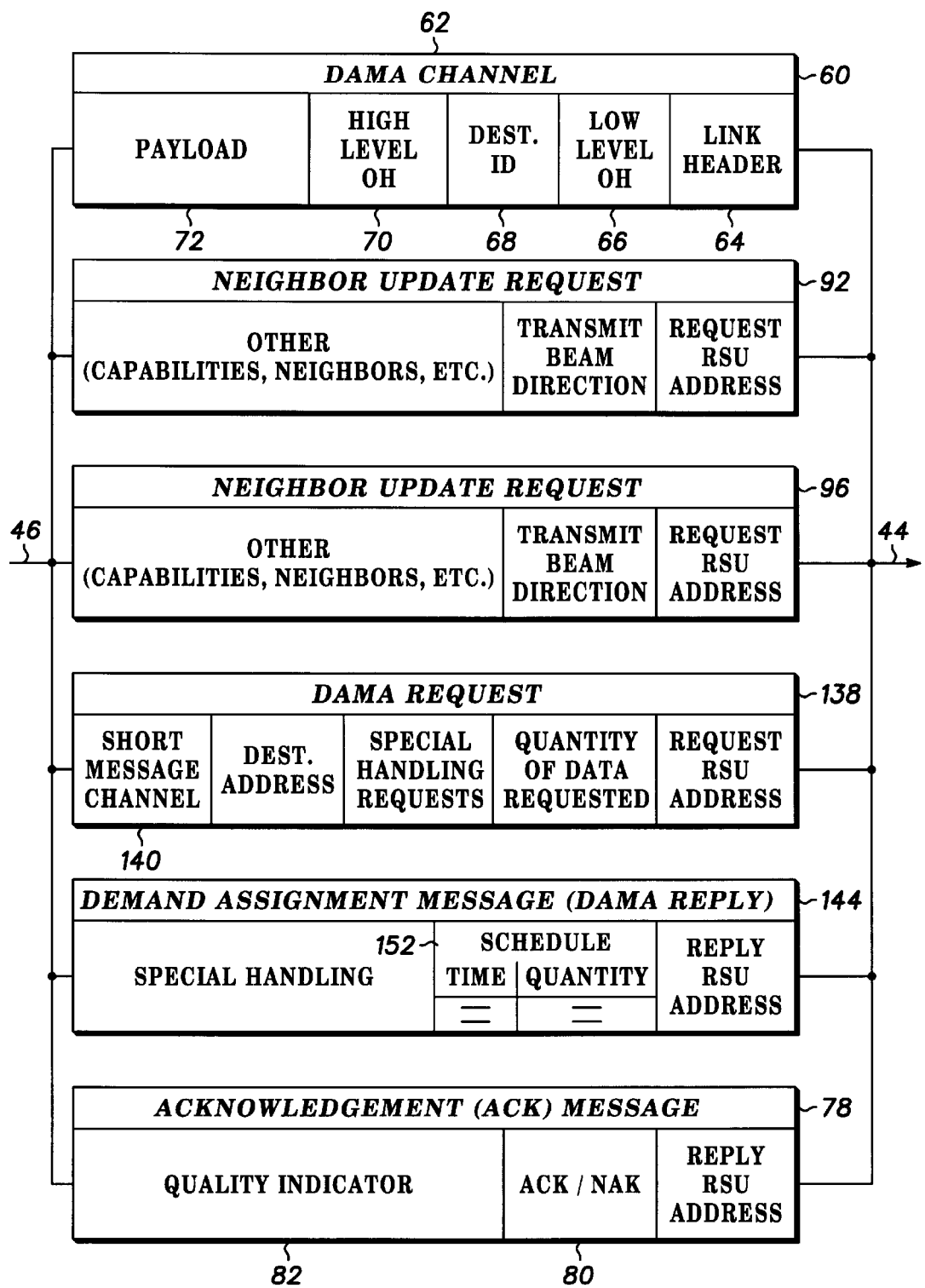
FIG. 5 shows a data format diagram of various channels and messages formed for transmit and receive paths of wireless communication links supported by the RSU shown in FIG. 2.

FIG. 5 shows a data format diagram of various channels and messages formed for transmit paths 44 (FIGS. 2–3) and receive paths 46 of the wireless communication links 25 supported by RSU 24. FIG. 5 illustrates an exemplary packet 60 which is conveyed over a demand assigned multiple access channel 62 protocol established for links 25. Packet 60 may include a link header 64, low level overhead (OH) control data 66, a destination (DEST) identification (ID) or address 68, high level overhead (OH) control data 70, and payload data 72. Of course, the present invention is not limited to just this specific data format, and additional types of data may be included, just as certain types of identified data may be omitted in certain applications, and the data fields rearranged in other applications.

Link header 64 is desirably encoded in accordance with a constant, reliable and robust protocol (e.g., a relatively slow BPSK or QPSK) which is expected by the receiving RSU 24 and easily detectable in spite of poor link conditions. Link header 64 provides instructions which indicate the protocols used for the rest of packet 60. As discussed in more detail below, such protocols may be selected to achieve the best performance for the current conditions of the link 25 over which packet 60 is being conveyed. Link header 64 may specify transmission parameters such as rate, coding, modulation type and order, and the like.

Low level overhead (OH) 66 desirably specifies control data useful for the physical and link layers in network 20. For example, low level overhead 66 may identify the RSU's 24 through which a packet 60 has previously passed so that another RSU 24 which is deciding where to route the packet 60 will not route the packet 60 in a loop back to one of the previously encountered RSU's 24.

Destination Identification (DEST ID) 68 provides the address of the intended destination of packet 60. The intended destination may be the RSU 24 currently in receipt of packet 60, another subscriber unit 24 in network 20, or a PTD 28 reachable through PSTN 26 (FIG. 1).

High level overhead (OH) 70 desirably specifies control data useful for the network, transport and possibly higher layers in network 20. For example, high level overhead 70 may specify packet sequencing so that the intended destination of a packet 60 may reassemble the packet 60 with other packets 60 in an intended order without duplication of packets 60.

Payload 72 represents subscriber data. The conveyance of payload 72 is one of the purposes for which network 20 is provided and communication services are provided thereby. PTD's 28 originate and consume payload data 72.

Referring to FIGS. 2, 4 and 5, when a packet 60 is received at RSU 24, RSU 24, and preferably router 34 thereof, performs an action 74. During action 74 RSU 24 30 evaluates destination identification (DEST ID) 68 of packet 60 and routes the packet 60 to a section of buffer 48, and of router queue 50 therein, which has been established to indicate where to send the packet 60. RSU 24 may also investigate low level overhead 66 in its evaluation and alter the contents of low level overhead 66 as needed. The packet 60 will eventually be sent to PTD 28 or LAN 36 associated with the RSU 24 performing the evaluation, another subscriber unit 24 or a PTD 28 reachable through PSTN 26 (FIG. 1). As a result of moving the data into the selected section of buffer 48, the capacity parameter of RSU buffer 48 (FIG. 2) indicates reduced buffering capacity because this data is now occupying memory space in buffer 48 of router 34.

Figures 6, 7:
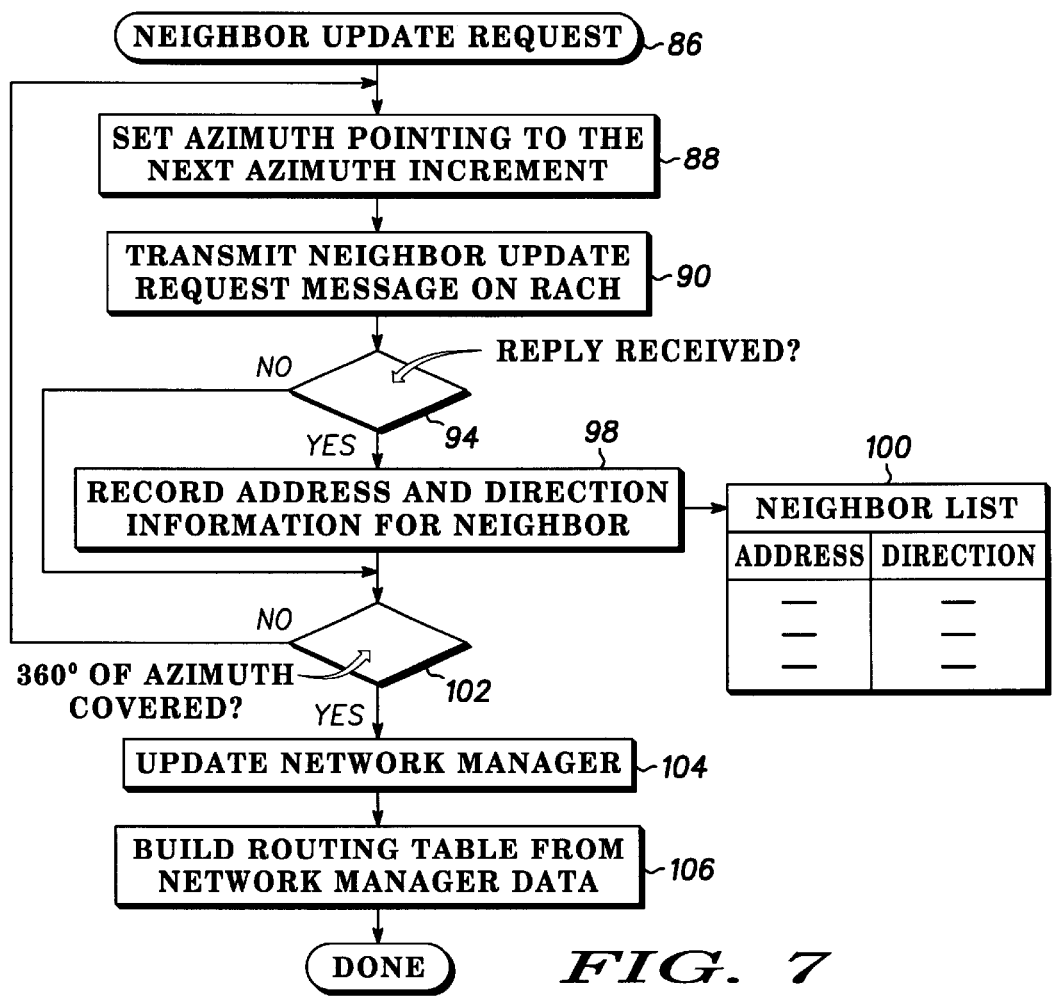
FIG. 6 shows an exemplary routing table built by and stored in the RSU shown in FIG. 2.
FIG. 7 shows a flow chart of a neighbor update request process performed by the RSU shown in FIG. 2.

FIG. 6 shows an exemplary routing table 76 built by and stored in RSU 24 and usable in action 74 to determine where to send packet 60. Referring to FIGS. 1 and 6, exemplary routing table 76 associates various routes or communication paths with various destinations which may be indicated by destination identification 68 (FIG. 5). These routes correspond to sections of queue 50 (FIG. 2) where action 74 places packet 60.

Moreover, the exemplary routing table 76 depicts a scenario which might be faced by an RSU 24', which has four communication links 25 to use in forwarding packet 60 toward its ultimate destination. These four links 25 are denoted by the letters: "A", "B", "C", and "D" in FIG. 1. For a destination that is reachable through PSTN 26, exemplary routing table 76 indicates that route "A" is the highest priority route, with route "D" being the lowest priority route. Route "A" may be denoted as the highest priority because PSTN 26 may be reached by two hops, with two-hop alternative routing options after the first hop. Route "C" may be denoted as the next highest priority because PSTN 26 may be reached by two hops, but with no two-hop alternative routing after the first hop. Routes "B" and "D" each offer three-hop routes to PSTN 26.

For a destination of an RSU 24", route "D" is indicated as being the highest priority because it offers a two-hop solution, with routes "C", "A" and "B" being of lower priority. A route associated with the local PTD 28 and LAN 36 may likewise be indicated in table 76 as through specified segments of queue 50. In action 74 (FIG. 4), RSU 24' may select the highest priority route available for the ultimate destination of packet 60 by evaluating routing table 76 and then place packet 60 in a corresponding portion of router queue 50.

Referring to FIGS. 4–5, action 74 also sends an acknowledgement (ACK) message 78 back to the node that sent packet 60 to RSU 24. As indicated in FIG. 5, acknowledgement message 78 may include the address of the replying RSU 24, a field 80 which distinguishes between acknowledgement (ACK) and no-acknowledgement (NAK) indications, and a field 82 which provides an indication of the quality of the signal which conveyed packet 60 and was received at RSU 24. As an example, a quality indicator may be a metric which specifies bit error rate (BER). As discussed in more detail below, acknowledgement message 78 provides one form of feedback to the RSU 24 which receives it. If an RSU 24 which transmits a packet 60 fails to receive acknowledgement message 78 in response to the transmission, that failure to receive message 78 is another form of feedback. The transmitting RSU uses this feedback in determining how to route packets 60 within network 20.

FIG. 4 indicates that RSU 24 responds to an event 84 which signals that a neighbor update is needed by performing an action 86. A neighbor update generally refers to discovering which RSU's 24 and gateways 22 may be neighbors of an RSU 24. A neighbor update may be needed when an RSU 24 is first installed at a particular location. In addition, a neighbor update may be needed upon a specified schedule, such as weekly, or when instructed to perform the update by network manager 30. Action 86 is referred to as neighbor update request process 86 below.

FIG. 7 shows a flow chart of neighbor update request process 86. Process 86 includes an optional task 88 in which an azimuth to which multi-directional wireless interface 40 (FIGS. 2–3) may be steered is determined. In a first iteration of task 88 the azimuth may be set to an arbitrary initial value, then incremented or decremented in subsequent iterations. Task 88 may be omitted if multi-directional wireless interface 40 is not steerable.

Following task 88, a task 90 transmits a neighbor update request message 92 over a random access channel (RACH) portion of transmit path 44 (FIG. 2). As depicted in FIG. 5, neighbor update request message 92 includes the address of the requesting RSU 24 and the azimuthal direction to which its multi-directional wireless interface 40 is steered. Of course, request message 92 may include additional data items, such as an indication of the capabilities of RSU 24 and an indication of any neighbors about which RSU 24 may be aware.

After task 90, a query task 94 determines whether a neighbor update reply message 96 has been received. Although not explicitly indicated, process flow may delay before performing task 94 to allow sufficient time for reply message 96 to be sent. An exemplary format for neighbor update reply message 96 is depicted in FIG. 5. Neighbor update reply message 96 may include the address of the replying RSU 24, the direction of beam steering used by that replying RSU 24 in transmitting reply message 96, and other optional data, such as capabilities of the replying RSU 24 and neighbors of RSU 24 which are known to RSU 24.

When task 94 determines that a reply message 96 was received, a task 98 records the replying RSU 24 address in a neighbor list 100 along with direction information for this neighbor. In an alternate embodiment, a communication session may be performed at task 98 between the transmitting and receiving subscriber units 24 to more precisely refine the optimum steering direction. After task 98 or when task 94 concludes that no reply message 96 (FIG. 5) was received in response to task 90, a query task 102 determines whether a complete scan with multi-directional wireless interface 40 has yet occurred. For example, a complete scan may occur after traversing a full 360° of azimuth. In alternate situations, obstructions 32 (FIG. 1) may militate against scanning a full 360° but some elevation scanning might be desirable. So long as a complete scan has not yet occurred, process flow loops to task 88 to transmit another neighbor update request 92 and await a neighbor update reply 96 (FIG. 5) for another direction.

When task 102 determines that a complete scan has now occurred, a task 104 updates network manager 30 (FIG. 1) with the list of neighbors obtained through the performance of process 86. The neighbor list in task 104 may be omitted if the network management system does not use these lists. Even though RSU 24 may not yet have a complete routing table 76 (FIG. 6) yet, merely addressing a message (not shown) to network manager 30 and placing the message in a queue associated with any neighbor of RSU 24 should be sufficient to insure delivery of the message to network manager 30. As indicated in a task 106, which may be delayed after the conclusion of task 104, RSU 24 then builds its routing table 76. In one embodiment, RSU 24 may build table 76 by receiving a communication from network manager 30 which already specifies alternate routes to associate with possible destinations reachable through network 20. Network manager 30, having knowledge of all subscriber units 24 and gateways 22 in network 20 and of their neighbors, may construct routing table 76 upon receipt of the message sent in task 104. In a preferred embodiment, RSU 24 itself may construct table 76 by learning of neighbor associations and gateway or RSU designations for the nodes of network 20 using one of the many dynamic routing procedures known in the art.

Following task 106, process 86 is complete.

Referring back to FIG. 4, RSU 24 responds to an event 108, which signals that a neighbor update request message 92 (FIG. 5) has been received, by performing an action 110. A neighbor update request message 92 may be received from another RSU 24 over the random access channel (RACH) of receive path 46 of a communication link 25 under the conditions set forth above in connection with FIG. 7. Action 110 is referred to as neighbor update reply process 110 below.

Figure 8:
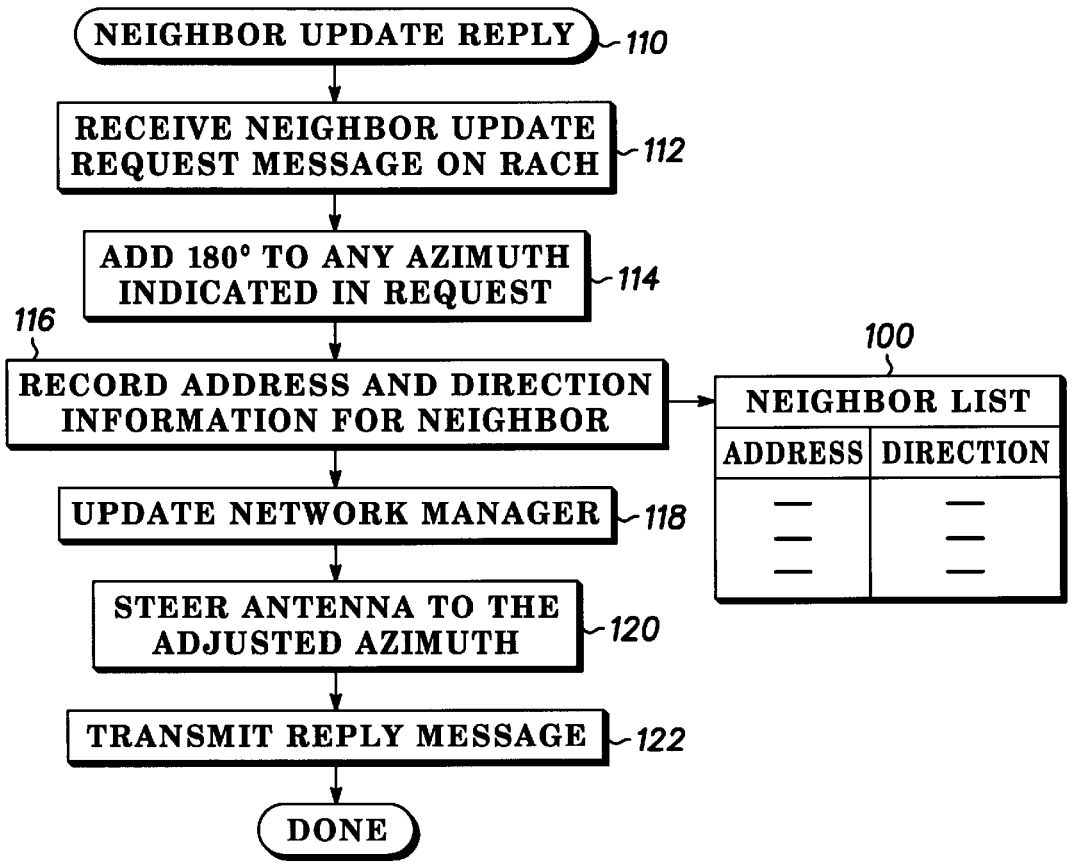
FIG. 8 shows a flow chart of a neighbor update reply process performed by the RSU shown in FIG. 2.

FIG. 8 shows a flow chart of neighbor update reply process 110. Neighbor update request message 92 (FIG. 5) is indicated as being received over the random access channel (RACH) during process 110 at a task 112. For the embodiment of multi-directional wireless interface 40 depicted in FIG. 3, message 92 may be received over omni-directional antenna 42'. Following the receipt of message 92, a task 114 adds 180° to any directional indication specified in neighbor update request message 92. Adding 180° determines the direction from the receiving RSU 24 to the transmitting RSU 24. Next, in a task 116 the request-receiving RSU 24 records the address and direction information of the request-sending subscriber unit 24 in its neighbor list 100. After task 116, a task 118 updates routing table 76 (FIG. 6) for the request-receiving RSU 24, and a task 120 steers antenna 42 (FIG. 3) to the adjusted direction which aims at the request-sending subscriber unit 24.

After task 120, a task 122 inserts the address of the request-receiving RSU 24, the direction, and any other information into neighbor update reply message 96, discussed above in connection with FIGS. 5 and 7, and transmits message 96 to the request-sending subscriber unit 24. In an alternate embodiment, a communication session may be performed at task 122 between the transmitting and receiving subscriber units 24 to more precisely refine the optimum steering direction. Following task 122, neighbor update reply process 110 is complete.

Referring back to FIG. 4, RSU 24 responds to an event 124, which signals that router queue 50 has data therein with a destination of the local PTD 28 (FIG. 2) for the RSU 24. RSU 24 responds to event 124 by performing an action 126. During action 126, RSU 24 moves the data intended for the local PTD 28 to the PTD 28. As a result of moving the data to PTD 28, the capacity parameter of RSU buffer 48 (FIG. 2) indicates additional buffering capacity because this data has been moved out of router 34 (FIG. 2).

RSU 24 responds to an event 128, which signals that router queue 50 has data therein with a destination within the local LAN 36 (FIG. 2) for the RSU 24. RSU 24 responds to event 128 by performing an action 130. During action 130, RSU 24 moves the data intended for the local LAN 36 to the local LAN 36. As a result of moving the data, the capacity parameter of RSU buffer 48 (FIG. 2) indicates additional buffering capacity because this data has been moved out of router 34 (FIG. 2).

RSU 24 also responds to an event 132. Event 132 signals that router queue 50 has data therein with a foreign destination, where a destination is considered foreign when it is not within the jurisdiction of RSU 24. More specifically, event 132 signals that the data to be conveyed is a long message, which means that a sufficient quantity of data is present so as to be considered too much for delivery using a short message channel, discussed below. When a long message having a foreign destination is discovered in router queue 50, RSU 24 performs an action 134. Action 134 is referred to as demand assigned multiple access (DAMA) request process 134 below.

Figure 9:
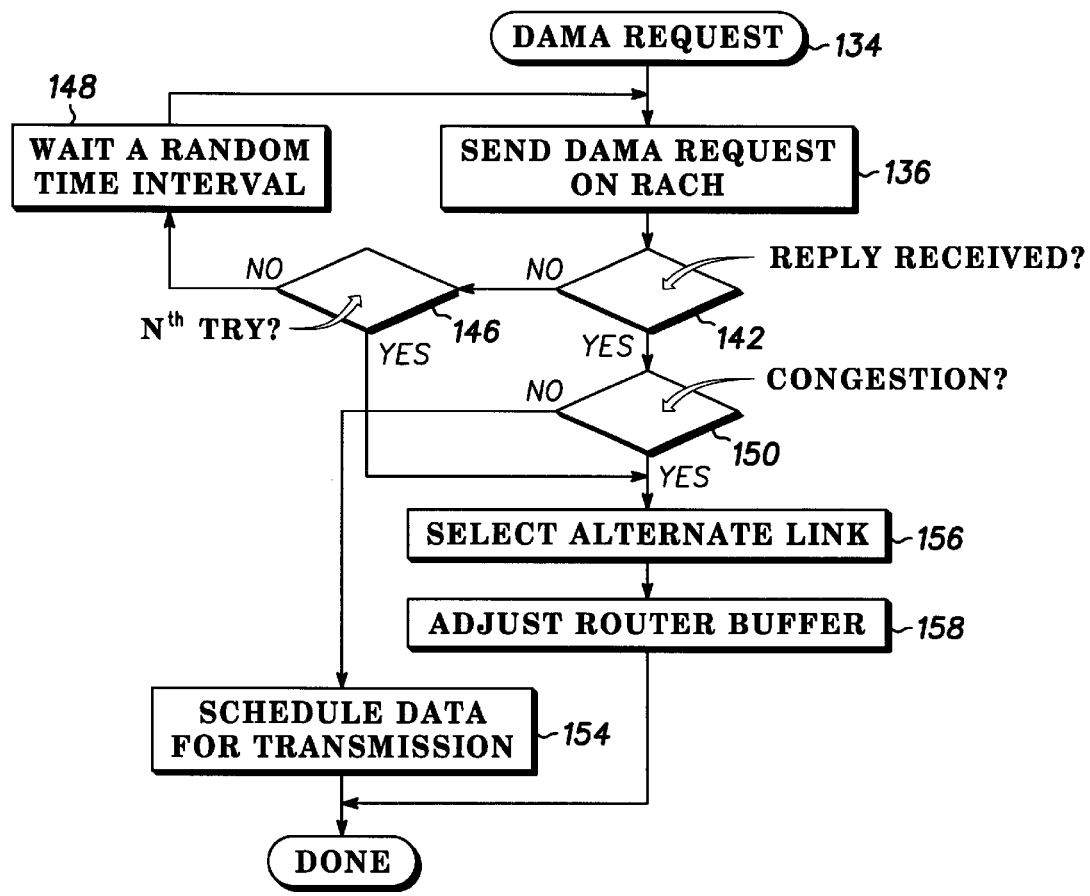
FIG. 9 shows a flow chart of a demand assigned multiple access (DAMA) request process performed by the RSU shown in FIG. 2.

FIG. 9 shows a flow chart of demand assigned multiple access (DAMA) request process 134. Generally, process 134 requests a neighbor to assign a specified amount of data-receiving capacity to RSU 24. The particular neighbor to whom the request is made may be implied by the section of router queue 50 (FIG. 2) which holds the data that triggered event 132 (FIG. 4). After a DAMA assignment is made by the specified neighbor, RSU 24 is then enabled to transmit the data conveyance to the receiving neighbor in accordance with the assignment.

Referring to FIGS. 5 and 9, process 134 includes a task 136 which sends a DAMA request message 138 to the specified neighbor over the random access channel (RACH) for that neighbor. DAMA request message 138 desirably includes fields for indicating the address of the requesting subscriber unit 24, the quantity of data whose receipt is being requested, special handling requests if any, such as a higher priority for which a higher billing rate may be charged, and the address of the destination for the data conveyance. In addition, message 138 may include a field 140 which serves as the above-discussed short message channel. When field 140 is populated, the conveyance is viewed as a request to transmit the short message included in the short message channel of field 140 to the indicated destination rather than an assignment of the DAMA channel.

After task 136, a query task 142 begins to evaluate feedback received from the neighbor in response to request message 138. After waiting a suitable period, task 142 determines whether a DAMA reply message 144 was received. If no reply was received, a query task 146 is performed to determine whether a predetermined number of attempts (e.g., two) have been made to obtain a DAMA reply message 144. If fewer than this predetermined number of attempts has been made, after waiting a random interval of time in a task 148, program flow loops back to task 136 to resend DAMA request message 138 to the neighbor.

When a DAMA reply message 144 is received from the neighbor, a query task 150 determines whether the reply message signals excessive congestion for the communication link 25 to the selected neighbor. DAMA reply message 144 represents another form of feedback which RSU 24 evaluates in deciding how to route data. DAMA reply message 144 includes fields which specify the address of the replying neighbor and any special handling requests to be adopted.

In addition, DAMA reply message 144 includes a schedule 152. Schedule 152 desirably indicates times at which the neighbor will accept the receipt of data and how much data will be accepted at the specified times. During task 150, the requesting RSU 24 may evaluate schedule 152 presented in DAMA reply message 144 to determine whether the schedule is acceptable. For example, the schedule may be deemed unacceptable if only a fraction of the entire data conveyance is scheduled or if the schedule indicates that the entire data conveyance will take an unacceptably long time.

If the schedule is deemed acceptable, then task 150 may conclude that excessive congestion is not present, and a task 154 is performed to schedule the data conveyance for transmission in accordance with schedule 152 of DAMA reply message 144. In scheduling data for transmission, data may be moved from router queue 50 to scheduled queue 52 (FIG. 2).

If the schedule is deemed unacceptable, then task 150 may conclude that excessive congestion is present, and a task 156 is performed to select an alternate communication link 25 over which to deliver the data conveyance. Likewise, if task 146 determines that no DAMA reply message 144 was received after attempting to obtain DAMA reply message 144 a predetermined number of times, task 156 is performed to select an alternate communication link 25. Task 156 may select an alternate communication link 25 by evaluating routing table 76 (FIG. 6) to obtain the next lower priority route indicated for the intended destination. Following task 156, a task 158 may adjust router queue 50 of buffer 48 to effectively reroute the data conveyance in accordance with the alternate link selected above in task 156. After task 158, DAMA request process 134 is complete. If an alternate link was selected in task 156, then event 132 (FIG. 4) will again be triggered to invoke DAMA request process 134 for the alternate link.

Referring back to FIG. 4, RSU 24 responds to an event 160, which signals that a DAMA request message 138 (FIG. 5) has been received over the RACH, by performing an action 162. A DAMA request message 138 may be received from another subscriber unit 24 in accordance with the conditions set forth above in connection with FIGS. 5 and 9. Action 162 is referred to as DAMA reply process 162 below.

Figure 10:
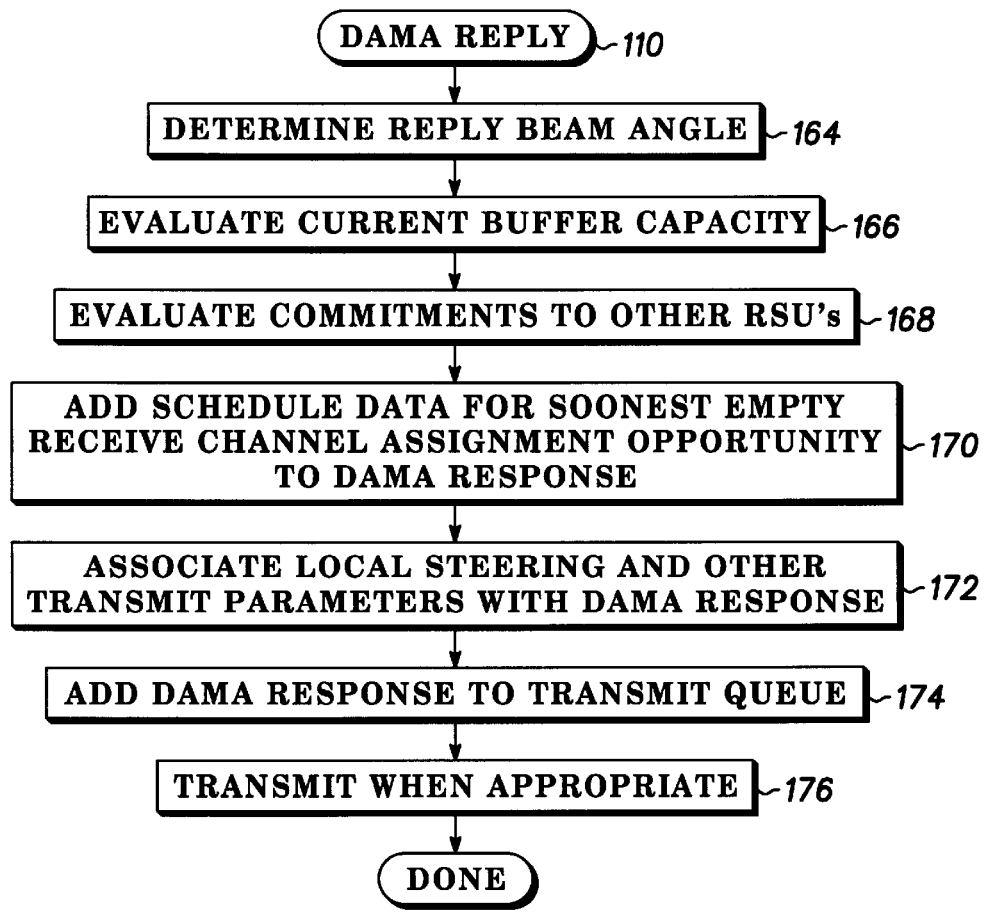
FIG. 10 shows a flow chart of a DAMA reply process performed by the RSU shown in FIG. 2.

FIG. 10 shows a flow chart of DAMA reply process 162. Process 162 includes a task 164 which determines a reply beam angle to use in sending DAMA reply message 144 to the requesting subscriber unit 24. The beam angle may be determined by evaluating neighbor list 100 (FIGS. 7–8) for the neighbor who sent DAMA request message 138.

After task 164, a task 166 evaluates the current capacity of buffer 48 (FIG. 2). The evaluation of task 166 indicates the amount of memory space available at the instant of evaluation for holding data conveyances. Next, a task 168 evaluates commitments made to other subscriber units 24. For example, such commitments include prior DAMA assignments made to neighbors for the receipt of data which may not have reached buffer 48 yet. In addition, such commitments include commitments for the receiver resources of RSU 24 that would be needed to receive the requested data conveyance.

Based upon the evaluations of tasks 166 and 168, a task 170 forms the demand assignment or DAMA reply message 144 (FIG. 5). In forming the demand assignment, task 170 formulates schedule 152 (FIG. 5). Desirably, schedule 152 reflects the soonest empty receive channel assignment opportunity or opportunities that can accommodate the requested data conveyance.

Following task 170, a task 172 associates local steering commands and other transmit parameters (e.g., CDMA, TDMA and/or FDMA assignments, modulation type and order, coding type, rate, etc.) with DAMA reply message 144, and a task 174 queues DAMA reply message 144 and the associated local steering commands and other transmit parameters for subsequent transmission. After task 174, a task 176 transmits DAMA reply message 144 to the requesting neighbor subscriber unit 24 when appropriate using the local steering commands and transmit parameters determined above in task 172. After task 176, process 162 is complete.

Referring back to FIG. 4, RSU 24 responds to an event 178, which signals that scheduled data included in buffer 48, and perhaps in scheduled queue 52 of buffer 48, is ripe for transmission. As discussed above in connection with FIGS. 5, 9 and 10, data conveyances over DAMA channels 62 (FIG. 5) of receive paths 46 are controlled by the RSU's 24 which are to receive the data conveyances. Such data conveyances are scheduled, preferably as to quantities of data which will be received and the times when the specified quantities will be received. Data in scheduled queue 52 becomes ripe for transmission at the instant specified by the schedule 152 (FIG. 5) for that data. When event 178 occurs, an action 180 is performed. Action 180 is referred to as DAMA transmit process 180 below.

Figure 11:
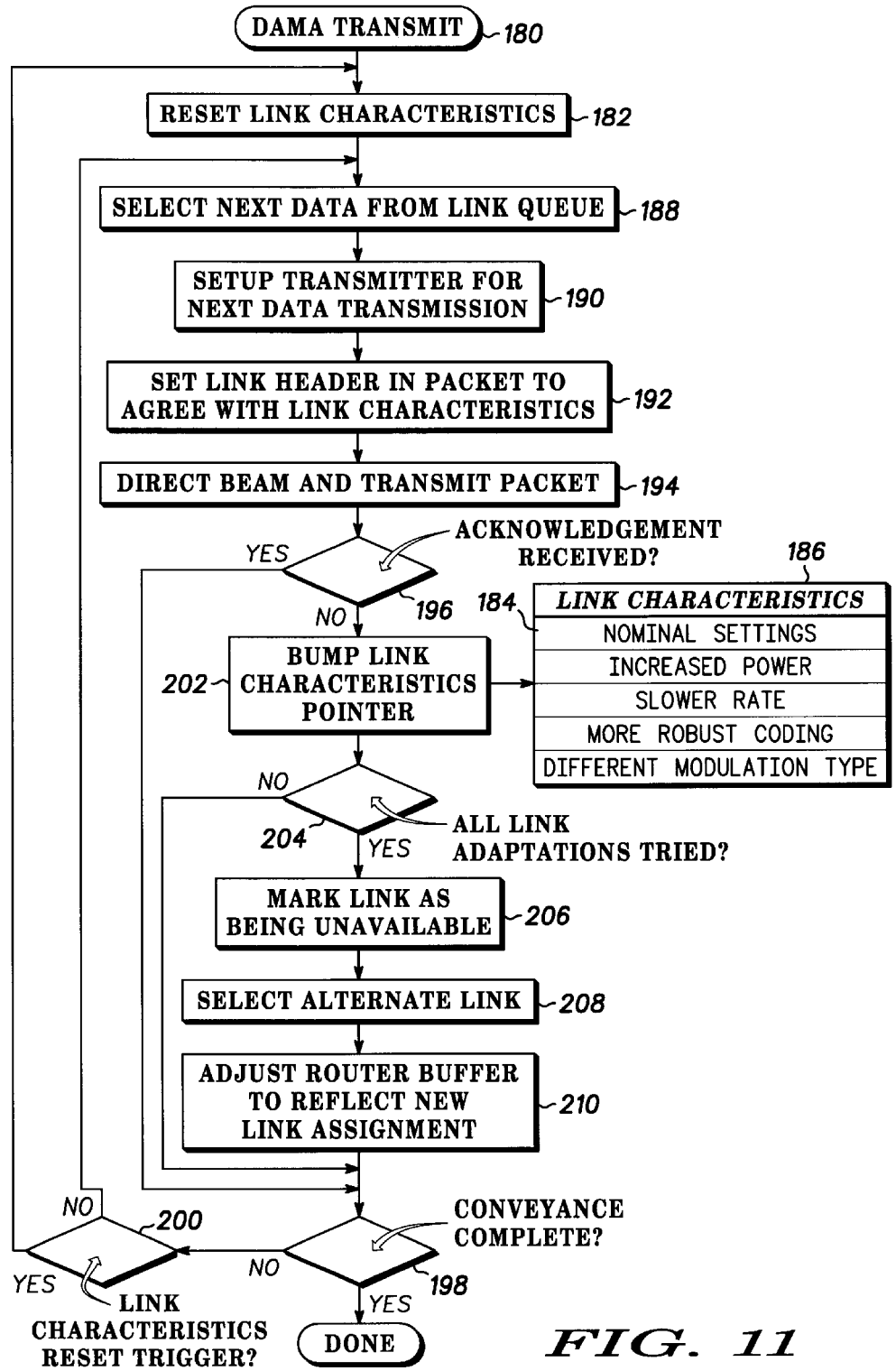
FIG. 11 shows a DAMA transmit process performed by the RSU shown in FIG. 2.

FIG. 11 shows a flow chart of DAMA transmit process 180. Process 180 includes a task 182 which resets link characteristics to an initial condition specified by nominal settings 184 in a link characteristics control table 186. The link characteristics include transmission parameters which characterize transmit path 44 of the communication link 25 (FIG. 2) over which transmission is to take place. Such parameters include transmit power, rate, coding, modulation order, modulation type, and the like.

After task 182, a task 188 selects the next segment of data from queue 52 and begins to form one or more packets 60 to convey this segment of data. The selected data is that data scheduled for transmission at the current time, and is associated with control data indicating where the data is to be transmitted. Following task 188, a task 190 sets up the transmitter portion of multi-directional wireless interface 40 (FIGS. 2–3) for the next data transmission. Task 190 may configure the transmitter as to coding format, rate, modulation order and type, transmitter power, and the like. After task 190, a task 192 sets link header 64 (FIG. 5) in all packets 60 to be transmitted in this data conveyance to agree with the current link characteristics established for transmit path 44. Next, a task 194 directs the antenna beam as required for transmission over the indicated communication link 25 and transmits one or more packets 60 to engage in wireless communication with the specified neighbor.

After task 194, and after a suitable delay (not shown), a query task 196 determines whether a suitable acknowledgement message 78 (FIG. 5) is received in response to the transmission of task 194. A suitable acknowledgement occurs when message 78 is received, message 78 indicates an ACK rather than a NAK, and if any signal quality indication is specified, the quality exceeds a predetermined threshold. So long as a suitable acknowledgement occurs, program flow proceeds to a query task 198. Task 198 determines whether all data scheduled to be conveyed in the current data conveyance has been transmitted. If all data has been conveyed, then process 180 is complete with respect to this data conveyance. However, when another data conveyance becomes ripe, event 178 (FIG. 4) will again invoke process 180 for that data conveyance.

When task 198 determines that additional data remains to be conveyed in the current data conveyance, a query task 200 is performed. Task 200 determines whether a triggering event has occurred to cause process 180 to reset the currently specified link characteristics. So long as no triggering event has occurred, program flow loops to task 188 to transmit another segment of data. If the triggering event has occurred, then program flow loops to task 182 to reset link characteristics prior to transmitting another segment of data.

Any of a wide variety of triggering events are contemplated in connection with task 200. For example, link characteristics may be reset upon a predetermined schedule. Alternatively, link characteristics may be reset when signal quality indicator 82 in a prior received acknowledgement message 78 (FIG. 5) indicates signal quality above a predetermined threshold, or when a message received from the relevant neighbor commands that the link characteristics be reset. Link characteristics may be reset by specifying operation at nominal settings 184. In an alternate embodiment, iterations of task 182 after the first iteration may simply bump link characteristics one level upward toward higher performance rather than completely reset link characteristics.

Referring back to task 196, any of several conditions may suggest an unsuitable acknowledgement. For example, after waiting an appropriate duration, task 196 may conclude that no acknowledgement message 78 (FIG. 5) was received by RSU 24. Alternatively, an acknowledgement message 78 may be received which conveys a NAK indication, or an acknowledgement message 78 may be received which indicates that a BER is unacceptably high. In any of these situations, a task 202 is performed.

Task 202 bumps a link characteristics pointer in link characteristics table 186 to specify a more robust communication link. For example, more robustness may result from increasing power over that used in connection with nominal settings. Still more robustness may result from using a slower data rate, a more robust encoding scheme, and different modulation orders or types from those specified in connection with nominal settings 184.

After task 202, a query task 204 determines whether all link adaptations specified for this communication link 25 have been tried. In other words, task 204 may evaluate whether the pointer bumped in task 202 is pointing past the end of link characteristics table 186. If fewer than all link adaptations have been tried so far, program control loops back to task 198 to test for ending the transmission loop and re-transmitting the data segment.

When task 204 determines that all link adaptations have been tried, a task 206 is performed to indicate that the subject communication link 25 is unavailable. Task 206 may make appropriate adjustments to neighbor list 100 (FIGS. 7–8) and to routing table 76 (FIG. 6). Next, a task 208 selects an alternate communication link 25 over which to deliver the data. Task 208 may make its selection by evaluating routing table 76 and identifying the next highest priority link for the indicated destination of the subject data conveyance.

Following task 208, a task 210 may adjust router queue 50 and/or scheduled queue 52 of buffer 48 to effectively reroute the data conveyance in accordance with the alternate link selected above in task 208. After task 210, program flow loops back to tasks 198 to test for the end of the transmission loop. When a data conveyance is rerouted in process 180, task 198 will declare the conveyance to be complete, but events 132 and 178 (FIG. 4) will reschedule transmission of the data conveyance over the alternate link.

Referring back to FIG. 4, RSU 24 also responds to an event 212. Event 212 signals that router queue 50 has data therein with a foreign destination, and the data is sufficiently short so that it may be transmitted using short message channel 140 (FIG. 5). When a short message having a foreign destination is discovered in router queue 50, RSU 24 performs an action 214. Action 214 uses the short message channel portion of the random access channel (RACH) to send the data. The random access channel is always configured to use the most robust set of link characteristics available. Action 214 may perform a process similar to DAMA request process 134 (FIG. 9). However, no data need be scheduled for transmission in task 154 (FIG. 9) because the data has already been transmitted in request message 138 (FIG. 5). The inclusion of both DAMA channel 62 (FIG. 5) and short message channel 140 (FIG. 5) over communication links 25 improves efficiency because the more complex process of running DAMA channel 62 may be avoided when short messages are to be transmitted. The distinction between a short message and a long message is not a critical feature of the present invention, and thresholds distinguishing the two messages lengths may vary from application to application.

In addition, RSU 24 responds to an event 216. Event 216 occurs when a trigger condition is detected for updating routing table 76 (FIG. 6). A variety of trigger conditions are contemplated. For example, routing table 76 may be updated on a schedule, in response to a command issued from network manager 30 (FIG. 1), when RSU 24 detects an unfamiliar destination address when routing protocol messages are received from other RSU's, and the like. When event 216 detects the trigger condition, an action 218 is performed. In a preferred embodiment, action 218 includes the RSU executing one of the many dynamic routing protocols known in the art. In an alternate embodiment, Action 218 requests and obtains a list of network subscriber units 24 and gateways 22 and their neighbors from network manager 30. In a third embodiment, action 218 may obtain a substantially resolved routing table 76 which has been compiled for RSU 24 by network manager 30. The requested list may be a compete list or a list of changes that have occurred since the last update. By performing action 218 from time to time, the routing intelligence held in RSU 24 is kept current.

In summary, the present invention provides improved repeating subscriber units usable in a wireless, connectionless network. Routing is performed on a node-to-node basis using independent routing intelligence distributed among the repeating subscriber units. End-to-end connections are not established except at network, transport and higher levels. Since transmission resources are allocated one hop at a time, a more efficient packing of routes within the network may result. Repeating subscriber units have no base station affiliation, but may communicate using any gateway or other repeating subscriber unit that furthers the delivery of data conveyances. Consequently, traffic bottlenecks are reduced.

Although the preferred embodiments of the present invention have been illustrated and described in detail, it will be readily apparent to those skilled in the art that various modifications and equivalents may be made therein without departing from the spirit of the invention or from the scope of the appended claims. For example, those skilled in the art will appreciate that the sequencing and grouping of tasks, events, actions and the configuration of data formats discussed herein can be greatly altered while achieving equivalent results. These and other changes and modifications are intended to be included within the scope of the present invention.

What is claimed is:

1. A repeating subscriber unit having independent routing intelligence for use in a wireless and connectionless communication network in which packets are routed among subscriber units under distributed control, said repeating subscriber unit comprising:

a multi-directional wireless interface which receives packets from any of a plurality of neighbor subscriber nodes and transmits packets to any of said plurality of neighbor subscriber nodes;

a router coupled to said interface;

a payload terminal device coupled to said router;

a controller coupled to said router and configured to identify to which of said neighbor subscriber units to route packets received at said router in response to feedback from said neighbor subscriber units;

said multi-directional wireless interface comprises an electronically steerable antenna;

said controller is configured to build a table identifying said neighbor subscriber units by causing said repeating subscriber unit, at each of a plurality of azimuthal directions, to transmit a neighbor update request message, to wait for receipt of a neighbor update reply, and to record data conveyed by said neighbor update reply if said neighbor update reply is received; and communication links having repeating subscriber unit transmit paths and repeating subscriber unit receive paths are respectively formed between said repeating subscriber unit and each of said neighbor subscriber units.

2. A repeating subscriber unit as claimed in claim 1 wherein said multi-directional wireless interface comprises at least one directional antenna having a gain of at least 10 dB.

3. A repeating subscriber unit as claimed in claim 1 wherein said repeating subscriber unit receive paths comprise demand assigned multiple access (DAMA) channels controlled by said controller.

4. A repeating subscriber unit as claimed in claim 1 wherein said feedback from said neighbor subscriber units comprises demand assignment messages originating from said neighbor subscriber units, said demand assignment messages being configured to control demand assigned multiple access (DAMA) channels respectively received at said neighbor subscriber units.

5. A repeating subscriber unit as claimed in claim 1 wherein said feedback from said neighbor subscriber units comprises acknowledgment messages originating from said neighbor subscriber units in response to packets transmitted from said repeating subscriber unit to said neighbor subscriber units over demand assigned multiple access (DAMA) channels.

6. A method of operating a repeating subscriber unit having independent routing intelligence, said method comprising:

receiving packets which indicate intended destinations, said intended destinations including said repeating subscriber unit and other subscriber units;

identifying neighbor subscriber units of said repeating subscriber unit;

engaging in wireless communication with said neighbor subscriber units;

determining to which of said neighbor subscriber units to route packets received at said repeating subscriber unit and intended for said other subscriber units in response to said intended destinations indicated by said packets received at said repeating subscriber unit and to feedback from said neighbor subscriber units;

said repeating subscriber unit has a buffer associated therewith, said buffer having a capacity parameter which varies in response to an amount of data held therein, and said method additionally comprises the steps of:

receiving a request for a data conveyance to be transmitted from one of said neighbor subscriber units and received by said repeating subscriber unit;

originating and transmitting to said one of said neighbor subscriber units a demand assignment message formed in response to said request and said capacity parameter, said demand assignment message instructing said one neighbor subscriber unit when to transmit said data conveyance; and communication links having repeating subscriber unit transmit paths and repeating subscriber unit receive paths are respectively formed between said repeating subscriber unit and each of said neighbor subscriber units.

7. A method as claimed in claim 6 additionally comprising maintaining a stationary location for said repeating subscriber unit.

8. A method as claimed in claim 6 wherein said method additionally comprises controlling said repeating subscriber unit receive paths to include demand assigned multiple access (DAMA) channels.

9. A method as claimed in claim 8 wherein said demand assignment message additionally instructs said one neighbor subscriber unit how much data to include in said data conveyance.

10. A method as claimed in claim 6 additionally comprising configuring said demand assignment message in response to commitments made by said repeating subscriber unit in connection with other data conveyances with others of said neighbor subscriber units.

11. A method as claimed in claim 6 wherein said feedback from said neighbor subscriber units comprises demand assignment messages originating from said neighbor subscriber units and configured to control demand assigned multiple access (DAMA) channels respectively received at said neighbor subscriber units.

12. A method as claimed in claim 6 wherein said feedback from said neighbor subscriber units comprises acknowledgment messages originating from said neighbor subscriber units in response to packets transmitted from said repeating subscriber unit to said neighbor subscriber units over demand assigned multiple access (DAMA) channels, said acknowledgement messages indicating quality at which said packets transmitted from said repeating subscriber unit are being received at said neighbor subscriber units.

13. A wireless and connectionless communication network in which packets are routed among subscriber units under distributed control, said network comprising:

a first subscriber unit having a router, a multi-directional wireless interface coupled to a router, and a payload terminal device coupled to said router;

a plurality of neighbor subscriber units in data communication with said first subscriber unit through said multi-directional wireless interface of said first subscriber unit;

wherein, said router is configured to identify to which of said neighbor subscriber units to route packets received at said router in response to feedback from said neighbor subscriber units;

said router of said first subscriber unit has a buffer associated therewith, said buffer having a capacity parameter which varies in response to an amount of data held therein;

said first subscriber unit is configured to receive a request for a data conveyance to be transmitted from one of said neighbor subscriber units and received by said first subscriber unit;

said first subscriber unit is further configured to originate and transmit to said one of said neighbor subscriber units a demand assignment message formed in response to said request and said capacity parameter, said demand assignment message instructing said one neighbor subscriber unit how much data to include in said data conveyance; and communication links having first subscriber unit transmit paths and first subscriber unit receive paths are respectively formed between said first subscriber unit and said neighbor subscriber units.

14. A wireless and connectionless communication network as claimed in claim 13 wherein said first subscriber unit and said plurality of neighbor subscriber units are stationary.

15. A wireless and connectionless communication network as claimed in claim 13 wherein said multi-directional wireless interface includes at least one directional antenna having a gain of at least 10 dB.

16. A wireless and connectionless communication network as claimed in claim 15 wherein said multi-directional wireless interface comprises an electronically steerable antenna.

17. A wireless and connectionless communication network as claimed in claim 13 wherein said first subscriber unit receive paths comprise demand assigned multiple access (DAMA) channels controlled by said first subscriber unit.

18. A wireless and connectionless communication network as claimed in claim 17 wherein said first subscriber unit receive paths additionally comprise short message channels.

19. A wireless and connectionless communication network as claimed in claim 13 wherein said first subscriber unit further configures said demand assignment message in response to prior commitments made by said first subscriber unit in connection with other data conveyances with others of said neighbor subscriber units.

20. A wireless and connectionless communication network as claimed in claim 13 wherein said first subscriber unit is further configured to receive said data conveyance from said one neighbor subscriber unit and to transmit an acknowledgement message to said one neighbor subscriber unit in response to said data conveyance, said acknowledgement message indicating a quality at which said data conveyance was received at said first subscriber unit from said one neighbor subscriber unit.

21. A wireless and connectionless communication network as claimed in claim 13 wherein said feedback from said neighbor subscriber units comprises demand assignment messages originating from said neighbor subscriber units and configured to control demand assigned multiple access (DAMA) channels respectively received at said neighbor subscriber units.

22. A wireless and connectionless communication network as claimed in claim 13 wherein:

some of said packets received at said router of said first subscriber unit have intended destinations reachable through a public switched telecommunication network (PSTN);

said network additionally comprises a plurality of gateways in wireless communication with said first subscriber unit and said neighbor subscriber units, said gateways each coupling to said public switched telecommunication network (PSTN); and said first subscriber unit is configured to route said some of said packets toward more than one of said plurality of gateways.

23. A wireless and connectionless communication network as claimed in claim 13 wherein said first subscriber unit is configured to build a routing table for use in determining how to route packets received at said router.

24. A wireless and connectionless communication network as claimed in claim 13 wherein:
said multi-directional wireless interface forms a plurality of wireless communication links between said first subscriber unit and said neighbor subscriber units;
each of said wireless communication links is characterized by link transmission parameters; and
said first subscriber unit is configured to control said link transmission parameters in response to said feedback from said neighbor subscriber units.

25. A wireless and connectionless communication network as claimed in claim 24 wherein said first subscriber unit is configured to attempt to route packets received at said router and intended for a destination to a first one of said neighbor subscriber units over a first one of said wireless communication links using a first setting of said link transmission parameters, then to alter said first setting of said link transmission parameters for said first one of said wireless communication links when a predetermined data transmission performance result is not achieved for said data intended for said destination, and then to attempt to route packets intended for said destination to a second one of said neighbor subscriber units over a second one of said wireless communication links when a predetermined data transmission performance result is still not achieved.

26. A wireless and connectionless communication network as claimed in claim 13 additionally comprising a local area network having a wireline connection to said router of said first subscriber unit.

27. A wireless and connectionless communication network as claimed in claim 13 wherein:
each of said neighbor subscriber units has a router coupled to a multi-directional wireless interface; and
said router of each neighbor subscriber unit is configured to operate substantially the same as said router of said first subscriber unit.

* * * * *